US00RE40016E

(19) United States
(12) Reissued Patent
Ribarich et al.

(10) Patent Number: US RE40,016 E
(45) Date of Reissued Patent: Jan. 22, 2008

(54) POWER FACTOR CORRECTION CONTROL CIRCUIT

(75) Inventors: Thomas J. Ribarich, Laguna Beach, CA (US); Robert Marenche, Torrance, CA (US); Dana S. Wilhelm, Temple City, CA (US)

(73) Assignee: International Rectifier Corporation, El Segundo, CA (US)

(21) Appl. No.: 10/870,901

(22) Filed: Jun. 18, 2004

Related U.S. Patent Documents

Reissue of:
(64) Patent No.: 6,259,614
Issued: Jul. 10, 2001
Appl. No.: 09/613,252
Filed: Jul. 10, 2000

U.S. Applications:
(60) Provisional application No. 60/142,949, filed on Jul. 12, 1999.

(51) Int. Cl.
*H02M 7/04* (2006.01)
*H02M 1/12* (2006.01)
*G05F 1/652* (2006.01)

(52) U.S. Cl. ..... 363/89; 363/44; 323/222; 323/284

(58) Field of Classification Search ..... 363/89, 363/44, 39, 84; 323/222, 284, 282, 283
See application file for complete search history.

(56) References Cited

U.S. PATENT DOCUMENTS

| | | | | | |
|---|---|---|---|---|---|
| 4,683,529 | A | | 7/1987 | Bucher, II | |
| 5,495,149 | A | * | 2/1996 | Hiramatsu et al. | 315/209 R |
| 5,757,166 | A | * | 5/1998 | Sodhi | 323/222 |
| 5,867,379 | A | * | 2/1999 | Maksimovic et al. | 363/89 |
| 5,872,430 | A | * | 2/1999 | Konopka | 315/219 |
| 5,912,549 | A | * | 6/1999 | Farrington et al. | 323/207 |
| 5,925,986 | A | * | 7/1999 | Moisin | 315/247 |
| 5,986,901 | A | * | 11/1999 | Weng | 363/44 |
| 5,991,172 | A | * | 11/1999 | Jovanovic et al. | 363/21 |
| 6,043,633 | A | * | 3/2000 | Lev et al. | 323/222 |
| 6,128,205 | A | * | 10/2000 | Bernd et al. | 363/89 |
| 6,141,230 | A | * | 10/2000 | Sum | 363/44 |
| 6,222,746 | B1 | * | 4/2001 | Kim | 363/89 |

OTHER PUBLICATIONS

Motorola Analog IC Device Data "Power Factor Controllers" pp. 1–16 Order this document by MC34262/D.

* cited by examiner

*Primary Examiner*—Bao Q. Vu
(74) *Attorney, Agent, or Firm*—Ostrolenk, Faber, Gerb & Soffen, LLP

(57) ABSTRACT

A power factor control circuit for an AC to DC power converter includes an inductor receiving AC rectified power. The charging time of the inductor is controlled by a switching circuit based on a comparison between a DC bus voltage and a fixed reference voltage. The circuit operates without an AC rectified line sensing network, and without a current-sensing resistor connected to the source of the MOSFET switch.

12 Claims, 4 Drawing Sheets

POWER FACTOR CORRECTION CONTROL CIRCUIT

Matter enclosed in heavy brackets [ ] appears in the original patent but forms no part of this reissue specification; matter printed in italics indicates the additions made by reissue.

This application claims the benefit of U.S. Provisional Application Serial No. 60/142,949 filed Jul. 12, 1999.

BACKGROUND OF THE INVENTION

1. Field of the Invention

The present invention relates to power factor correction for AC to DC power converters, and more specifically, to AC to DC power converters having power factor correction circuitry utilizing a minimal component count and minimal IC pin count without loss of performance.

2. Brief Description of the Related Art

In most AC to DC power converters, it is convenient to have the circuit act as a pure resistor to the AC input line voltage. To achieve this, active power factor correction (PFC) can be implemented which, for an AC input line voltage, produces an AC input line current.

It also is important to produce a sinusoidal input current which has a low total harmonic distortion (THD). THD and power factor (PF) represent performance measurements of how well the PFC circuit works. A power factor (PF) of 1.0 represents the highest achievable, and a THD lower than about 15% is acceptable in practice.

A typical solution for providing active power factor correction is shown in circuit 2 of FIG. 1. Circuit 2 has a boost-type converter topology and a PFC IC 4 such as the Motorola 34262. The resulting circuit requires a voltage divider network (resistors 6 and 8 and capacitor 10) for sensing the AC rectified line input. Additionally, a secondary winding on the boost inductor 12 detects the zero-crossing of the inductor current. Also, a current sensing resistor 14 in the source of the boost switch 16 shapes the peak inductor current and detects an over-current condition. A voltage-divider network (resistors 18 and 20) senses and regulates a constant DC bus voltage and detects an over-voltage condition due to load transients. A compensation capacitor 22 is required for a stable loop response.

Accordingly, the need exists in the prior art for implementation of a simpler active power factor correction (PFC) circuit having fewer components.

SUMMARY OF THE INVENTION

The present invention overcomes the deficiencies of the prior art by providing a new control method that results in a minimal component count, minimal IC pin count, and the same performance as standard PFC ICs available on the market.

The power factor control circuit of the present invention includes an inductor for receiving AC rectified power and a switch for charging/discharging the inductor. A switching circuit connected to the inductor controls the on-time of the switch, and thereby the charging time of the inductor, by comparing a DC bus voltage to a fixed reference voltage. The switching circuit also controls the off-time of the switch, and thereby the discharging time of the inductor, by turning the switch off until the inductor current discharges to zero, as detected by the switching circuit, such that the off-time of the switch varies as a function of the peak inductor current during each switching cycle. Preferably the switch is a MOSFET, and the inductor includes a secondary winding which is used by the switching circuit to determine the inductor current.

Advantageously, the MOSFET operates without a current-sensing resistor connected in series with the source of the MOSFET. Further, the on-time of the switch is modulated as a function of the off-time of the switch to achieve lower total harmonic distortion. In addition, the current in the inductor follows the sinusoidal voltage of the AC rectified power as the switching circuit is turned on and off at a much higher frequency than the line frequency of the AC rectified power, thereby eliminating the need to sense the rectified AC line input voltage.

DETAILED DESCRIPTION OF PREFERRED EMBODIMENTS

Figure 1:
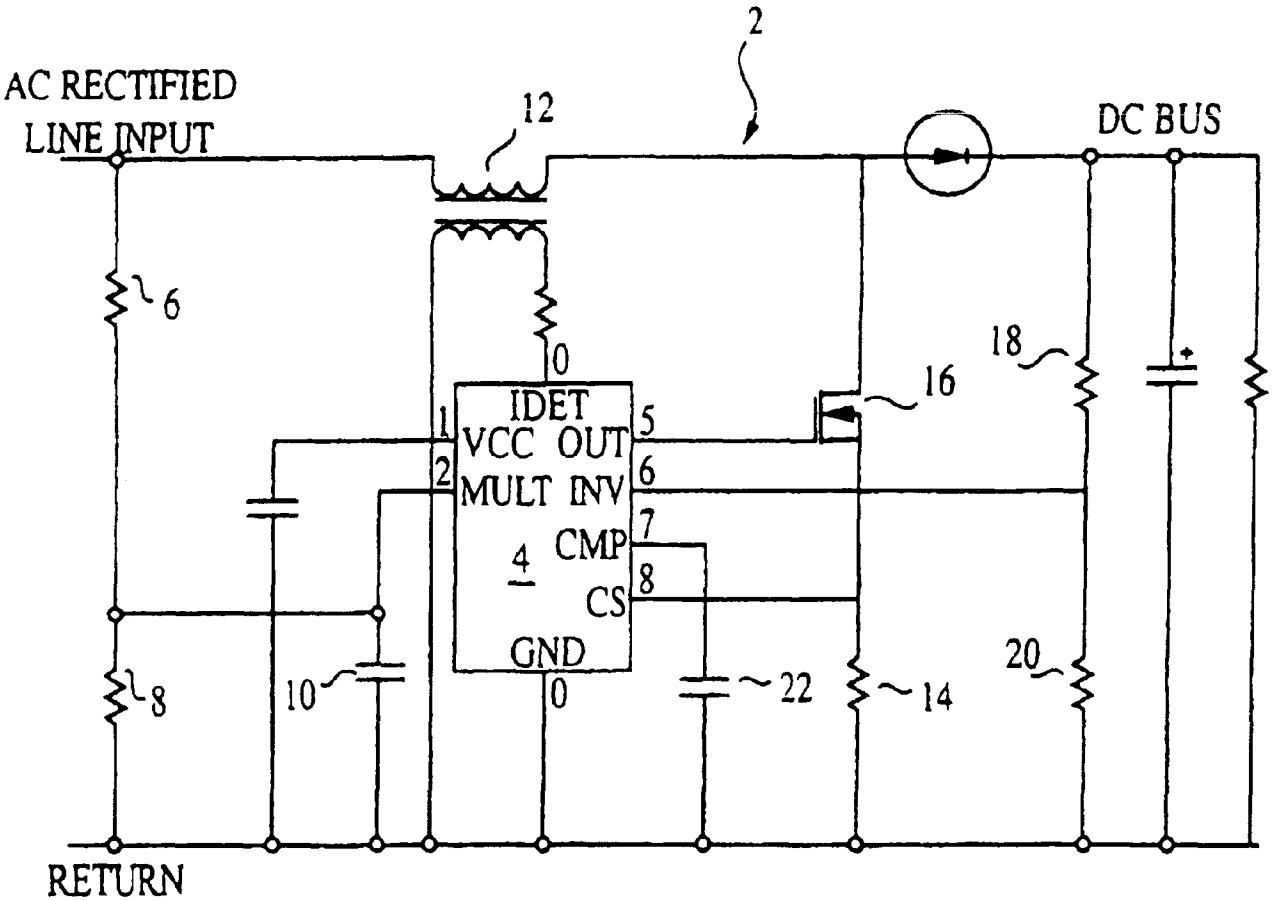
FIG. 1 PRIOR ART
FIG. 1 is a circuit diagram showing a prior art power factor control circuit of an AC to DC power converter.
Figure 2:
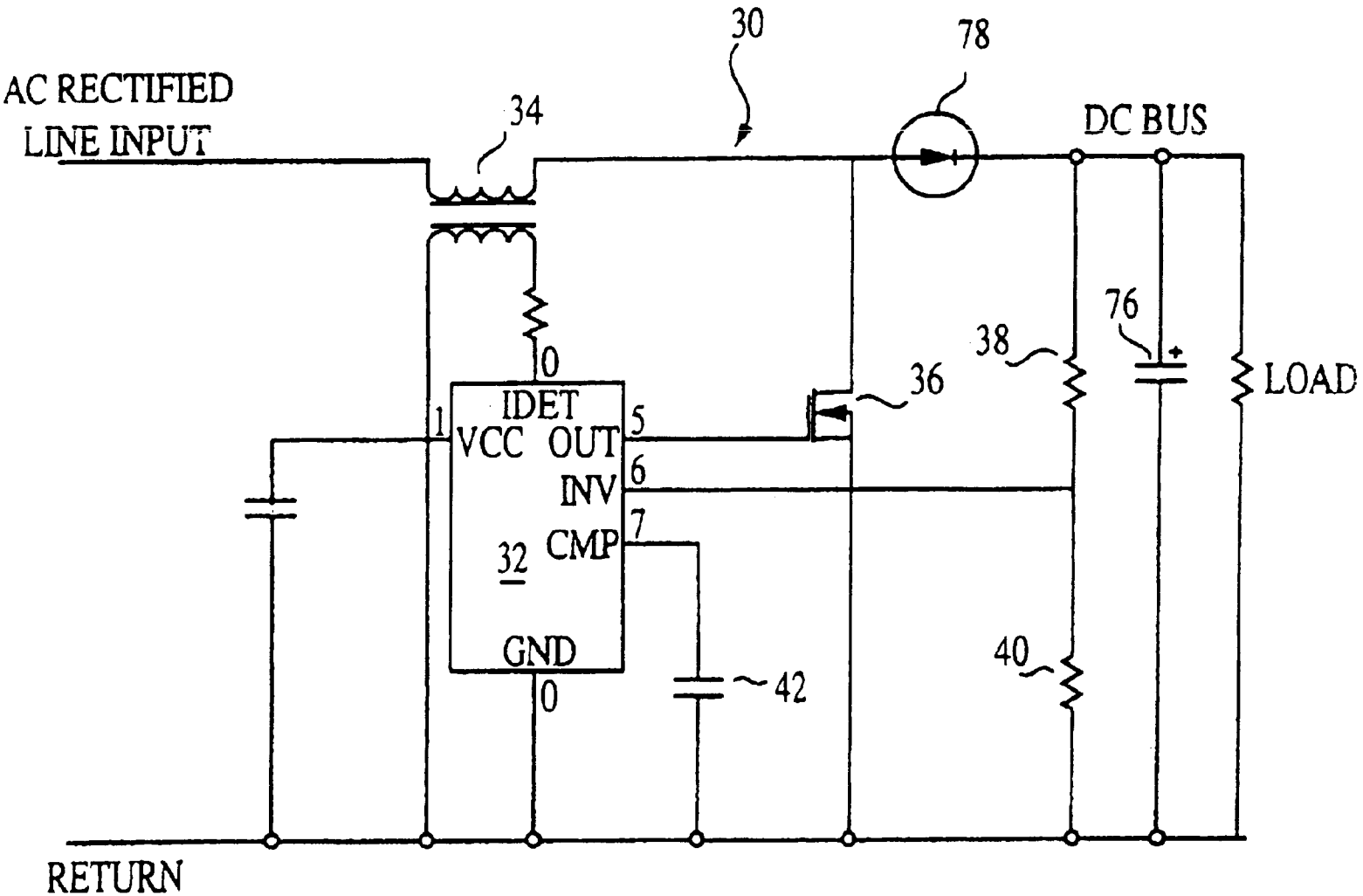
FIG. 2 is a circuit diagram showing a power factor control circuit according to the present invention.

Referring to FIG. 2, the power factor correction circuit 30 of the present invention is shown. Circuit 30 includes IC 32. A secondary winding on the boost inductor 34 detects the zero-crossing of the inductor current. Unlike the prior art circuit shown in FIG. 1, in the circuit of the present invention, no current sensing resistor is required in series with the source of MOSFET 36. A voltage-divider network (resistors 38 and 40) senses and regulates a constant DC bus voltage and detects an over-voltage condition due to load transients. A compensation capacitor 22 provides a stable loop response.

Figure 3:
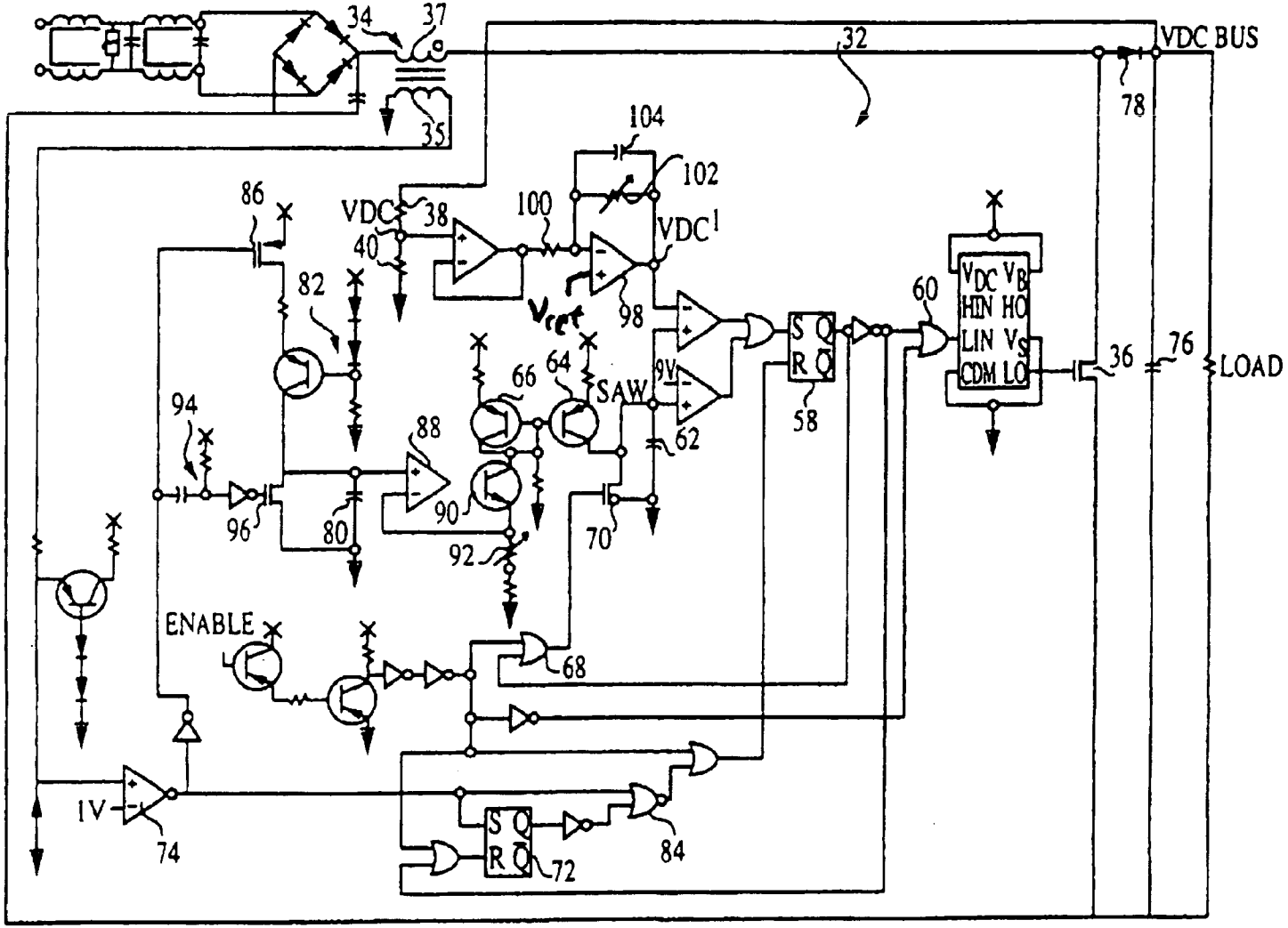
FIG. 3 is a circuit diagram showing an AC to DC power converter incorporating a power factor control circuit according to the present invention.
Figure 4:
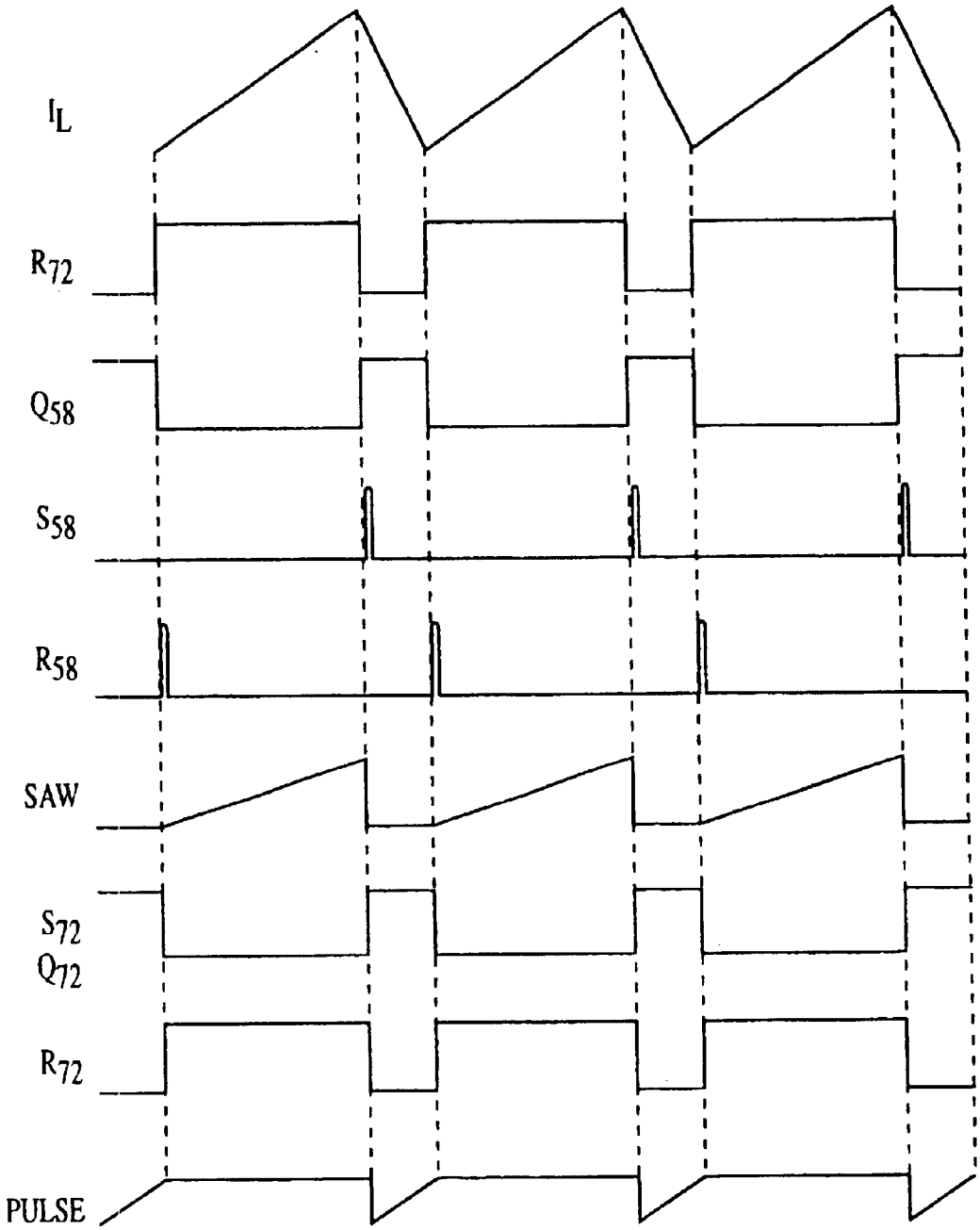
FIG. 4 is a timing diagram for the circuit of FIG. 3.

The invention will be described in further detail with reference to FIG. 3, which shows the circuitry within IC 32, wherein like elements are identified by like reference numerals. The corresponding timing diagram for the invention is shown in FIG. 4. The circuit of the present invention is classified as running in critical continuous mode, in which the inductor current discharges to zero during each switching cycle. The functionality of the circuit relies on the fact that there is no need to sense the rectified AC line input voltage because it is already sinusoidal. Therefore, the current in inductor 34 will naturally follow the sinusoidal voltage envelope as the boost MOSFET 36 is turned on and off at a much higher frequency (>10 kHZ) than the input line frequency (~50-60 Hz).

The circuit of the present invention compares the DC bus voltage to a fixed reference voltage (Vref) to determine the charging time of the boost inductor 34 (or on-time of the boost switch 36). The circuit then turns off the boost switch 36 until the inductor current discharges to zero, as detected by the secondary winding 35 on the boost inductor 34.

The on-time is controlled by the DC bus and the off-time changes as a function of how high the peak inductor charges each switching cycle. The result is a system where the switching frequency is free-running and constantly changing from a higher frequency near the zero-crossings of AC input line voltage, to a lower frequency at the peaks.

A further improvement to the circuit, to achieve a low total harmonic distortion (THD), involves dynamically modulating the on-time as a function of the off-time. All of these functions are described in more detail in the following text.

When the circuit is first enabled (ENABLE signal goes logic "high") the Q output of latch 58 is low, both inputs of the AND gate 60 are high, and the boost MOSFET 36 is turned on. The boost inductor 37 is shorted to ground and begins charging (see Timing Diagram, FIG. 4).

The inductor current charges up until the sawtooth voltage (VSAW), resulting from capacitor 62 being charged by the current mirror comprised of transistors 64 and 66, reaches the output voltage (VDC') from the DC bus feedback circuitry. Once this occurs, the set input S of latch 58 goes high causing the Q output to go "high" and the boost MOSFET 54 to turn off. The Q output of latch 58 also discharges capacitor 62 through OR gate 68 and MOSFET 70, and the Q output of latch 58 forces the reset input R of latch 72 "low", therefore freeing latch 72.

When the boost MOSFET 36 turns off, the secondary winding output 35 of the boost inductor 34 goes "high," causing the output of comparator 74 to go "high," as well as the S input of latch 72. During this "off" time, the inductor current discharges into the DC bus capacitor 76 through diode 78 and the modulation capacitor 80 charges up through current source 82.

When the boost inductor current discharges to zero, secondary winding output 56 goes "low", causing the output of NOR gate 84 to go "high," and therefore the reset input R of latch 58 goes "high" and the boost MOSFET 36 turns on again, and the boost inductor 37 charges again. The transition of secondary winding output 35 to "low" also turns MOSFET 86 off, therefore turning the current source 82 off as well.

The voltage on capacitor 80 then remains constant for the duration of the on time. This voltage is converted to a current through OPAMP 88, transistor 90, and variable resistor 92, and defines the charging current for capacitor 62. As the off-time varies for each switching cycle, so does the voltage on capacitor 80, and therefore the rate at which capacitor 62 charges. By adjusting the modulation gain with resistor 92, the amount of modulation of the on-time as a function of the off-time can be controlled. The longer the off-time, the higher capacitor 80 charges, the higher the current charging capacitor 62, the faster capacitor 62 reaches the VDC threshold, and the shorter the on-time of boost MOSFET 54.

Inversely, the shorter the off-time, the longer the on-time. This modulation effect changes dynamically over each cycle of the low-frequency AC line input voltage, with the on-time being slightly longer at the zero-crossings than at the peaks. Compared to a fixed on-time over the entire cycle, the modulated solution results in a "flatter" envelope with less cross-over distortion in the line current which gives lower total harmonic distortion (THD).

The voltage on capacitor 80 is discharged to zero at the beginning of each offtime with a pulse generator (PGEN1) 94 and MOSFET 96. OPAMP 98 and biasing resistors 100 and 102 and capacitor 104 determine the gain and speed of the feedback loop for the DC bus regulation.

Although the present invention has been descried in relation to particular embodiments thereof, many other variations and modifications and other uses will become apparent to those skilled in the art. Therefore, the present invention is to be limited not by the specific disclosure herein, but only by the appended claims.

What is claimed is:

1. A power factor control circuit for an AC to DC power converter, the circuit comprising:

an inductor configured to receive AC rectified power *from an AC line input voltage*; and a switching circuit connected to the inductor and including a switch for switching current through the inductor on and off;

the switching circuit controlling the on-time of the switch, and thereby the charging time of the inductor, by comparing a DC bus voltage to a fixed reference voltage, the switching circuit controlling the off-time of the switch, and thereby the discharging time of the inductor, by turning the switch off until the inductor current discharges to zero, as detected by the switching circuit, such that the off-time of the switch varies as a function of the peak inductor current during each switching cycle,

*wherein the on-time of the switch is controlled to be longer at the zero crossings of the AC line input voltage thereby to achieve lower total harmonic distortion.*

2. The power factor control circuit of claim 1, wherein the switch comprises a MOSFET.

3. The power factor control circuit of claim 2, wherein the MOSFET operates without a current-sensing resistor connected in series with the source of the MOSFET.

4. The power factor control circuit of claim 1, wherein the on-time of the switch is modulated as a function of the off-time of the switch to achieve lower total harmonic distortion.

5. The power factor control circuit of claim 1, wherein the current in the inductor follows the sinusoidal voltage of the AC rectified power as the switching circuit is turned on and off at a much higher frequency than the line frequency of the AC rectified power, thereby eliminating the need to sense the rectified AC line input voltage.

6. The power factor control circuit of claim 1, wherein the inductor includes a secondary winding which is used by the switching circuit to determine the inductor current.

7. A method of power factor control in an AC to DC power converter using a power factor control circuit having an inductor configured to receive AC rectified power *from an AC line input voltage*; and a switching circuit connected to the inductor and having a switch for switching current through the inductor on and off, the method comprising the steps of:

controlling the on-time of the switch, and thereby the charging time of the inductor, by comparing a DC bus voltage to a fixed reference voltage, controlling the off-time of the switch, and thereby the discharging time of the inductor, by turning the switch off until the inductor current discharges to zero, as detected by the switching circuit, such that the off-time of the switch varies as a function of the peak inductor current during each switching cycle, *further comprising increasing the on-time of the switch at the zero crossings of the AC line input voltage thereby to achieve lower total harmonic distortion.*

8. The method of power factor control of claim 7, wherein the switch comprises a MOSFET.

9. The method of power factor control of claim 8, wherein the on-time and off-time of the MOSFET are controlled without a current-sensing resistor connected in series with the source of the MOSFET.

10. The method of power factor control of claim 7, wherein the on-time of the switching circuit is modulated as a function of the off-time to achieve lower total harmonic distortion.

11. The method of power factor control of claim 7, wherein the current in the inductor follows the sinusoidal voltage of the AC rectified power as the switching circuit is turned on and off at a much higher frequency than the line frequency of the AC rectified power, thereby eliminating the need to sense the rectified AC line input voltage.

12. The method of power factor control of claim 7, wherein the inductor includes a secondary winding which is used by the switching circuit to determine the inductor current.

* * * * *